US012610078B2

(12) United States Patent
Chen et al.

(10) Patent No.: US 12,610,078 B2
(45) Date of Patent: Apr. 21, 2026

(54) CHROMA BDOF AND ADAPTIVE MULTI-PASS DMVR IN VIDEO CODING

(71) Applicant: QUALCOMM Incorporated, San Diego, CA (US)

(72) Inventors: Chun-Chi Chen, San Diego, CA (US); Han Huang, San Diego, CA (US); Zhi Zhang, Munich (DE); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/755,388

(22) Filed: Jun. 26, 2024

(65) Prior Publication Data

US 2025/0008147 A1 Jan. 2, 2025

Related U.S. Application Data

(60) Provisional application No. 63/511,514, filed on Jun. 30, 2023.

(51) Int. Cl.
| | |
|---|---|
| *H04N 19/513* | (2014.01) |
| *H04N 19/105* | (2014.01) |
| *H04N 19/186* | (2014.01) |
| *H04N 19/196* | (2014.01) |

(52) U.S. Cl.
CPC ......... *H04N 19/521* (2014.11); *H04N 19/105* (2014.11); *H04N 19/186* (2014.11); *H04N 19/198* (2014.11)

(58) Field of Classification Search
None
See application file for complete search history.

(56) References Cited

U.S. PATENT DOCUMENTS

| | | | | |
|---|---|---|---|---|
| 12,395,670 | B2 * | 8/2025 | Rufitskiy | H04N 19/30 |
| 2019/0045215 | A1 * | 2/2019 | Chen | H04N 19/577 |
| 2021/0321111 | A1 * | 10/2021 | Tamse | H04N 19/137 |

(Continued)

OTHER PUBLICATIONS

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 29 20th Meeting, by Teleconference, Oct. 7-16, 2020, pp. 1-515.

(Continued)

*Primary Examiner* — Lindsay J Uhl
(74) *Attorney, Agent, or Firm* — Shumaker & Sieffert, P.A.

(57) ABSTRACT

A device for decoding video data determines a luma prediction block for a luma block of a current block using an initial motion vector; applies one or more decoder-side motion vector refinement processes to the luma prediction block to determine a refined luma prediction block and refined motion vectors, the one or more motion vector refinement processes comprising a bi-directional optical flow (BDOF) process; for a chroma sample of a chroma block, determines a motion vector for the chroma sample based on refined motion vectors of one or more co-located luma samples of the luma block; determines a chroma prediction sample for a chroma prediction block based on the motion vector for the chroma sample; and determines a decoded version of the current block based on the refined luma prediction block and the chroma prediction block.

22 Claims, 8 Drawing Sheets

(56) References Cited

U.S. PATENT DOCUMENTS

| | | | |
|---|---|---|---|
| 2022/0201313 A1 | 6/2022 | Zhang et al. | |
| 2024/0031578 A1* | 1/2024 | Chen | H04N 19/159 |

OTHER PUBLICATIONS

Browne A., et al., "Algorithm Description for Versatile Video Coding and Test Model 198 (VTM198)", JVET-AC2002-v1, Joint Video Experts Team (JVET) of ITU-T SG 16 WP 3 and ISO/IEC JTC 1/SC 29 29th Meeting Teleconference, Jan. 11-20, 2023, pp. 1-138.

Chen C-C., et al., "Non-EE2: Sample-Based BDOF for Chroma", JVET-AE0168-v2, Joint Video Experts Team (JVET) of ITU-T SG 16 WP 3 and ISO/IEC JTC 1/SC 2931st Meeting, Geneva, CH, Jul. 11-19, 2023, pp. 1-2.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

Chen J., et al., "Algorithm Description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting, Marrakech, MA, Jan. 9-18, 2019, pp. 1-64.

Coban M., et al., "Algorithm Description of Enhanced Compression Model 9 (ECM 9)", JVET-AD2025, Joint Video Experts Team (JVET) of ITU-T SG 16 WP 3 and ISO/IEC JTC 1/SC 29 30th Meeting, Antalya, TR, Apr. 21-28, 2023, pp. 1-76.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "Exploration Experiment on Enhanced Compression beyond VVC capability (EE2)", JVET-AD2024-v2, Joint Video Experts Team (JVET) of ITU-T SG 16 WP 3 and ISO/IEC JTC 1/SC 29 30th Meeting, Antalya, TR, Apr. 21-28, 2023, pp. 1-15.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.

Wang Y-K., et al., "High Efficiency Video Coding (HEVC) Defect Report", JCTVC-N1003_v1, Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 311 Pages.

Chen (Alibaba-Inc) J., et al., "Non-EE2: Improvements on Multi-pass DMVR," No. JVET-AD0176-v2, Joint Video Experts Team (JVET) of ITU-T SG 16 WP3 and ISO/IEC JTC 1/SC 29/WG11, 30th JVET Meeting, Antalya, TR, Apr. 21, 2023-Apr. 28, 2023, m62842, Apr. 22, 2023, 2 Pages, XP030308908, Sections 1 and 2, Figure 1.

Chujoh T., et al., "Non-CE9: BDOF for Chroma Components," No. JVET-O0210-V2, Joint Video Experts Team (JVET) of ITU-T SG 16 WP 3 and ISO/IEC JTC 1/SC 29/WG 11, 15th JVET Meeting, Gothenburg, SE, Jul. 3, 2019-Jul. 12, 2019, m48319, Jul. 3, 2019, 6 Pages, XP030218864, Abstract, Sections 1 and 4, Figure 1, Tables 2-5.

International Search Report and Written Opinion—PCT/US2024/035852—ISA/EPO—Oct. 29, 2024 14 Pages.

Van (Qualcomm) L.P., et al., "CE2-related: 4×4 Chroma Affine Motion Compensation and Motion Vector Rounding Unification," JVET-M0462-v2, Joint Video Experts Team (JVET) of ITU-T SG 16 WP 3 and ISO/IEC JTC 1/SC 29/WG 11, 13th Meeting, Marrakech, MA, Jan. 9-18, 2019, 125th MPEG Meeting, Jan. 14, 2019-Jan. 18, 2019, Marrakech, (Motion Picture Expert Group or ISO/IEC JTC1/SC29/WG11), No. m45736, Jan. 5, 2019, 4 Pages, XP030198408, Sections 1 and 2.1.

* cited by examiner

4x4 BLOCK
132

6x6 SURROUNDING REGION
134

SAMPLES AND GRADIENTS PADDING
136

EXTENDED CU REGION IN BDOF

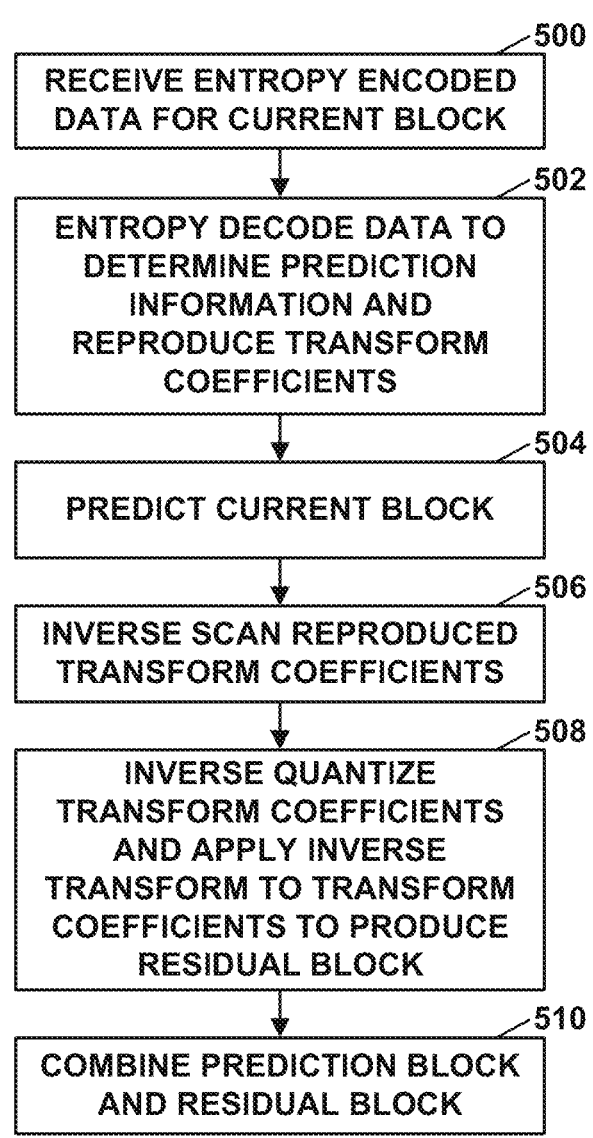

```
                                              ┌─500
        ┌──────────────────────────────┐
        │  RECEIVE ENTROPY ENCODED     │
        │   DATA FOR CURRENT BLOCK     │
        └──────────────────────────────┘
                        │
                        ▼                     ┌─502
        ┌──────────────────────────────┐
        │  ENTROPY DECODE DATA TO      │
        │  DETERMINE PREDICTION        │
        │  INFORMATION AND             │
        │  REPRODUCE TRANSFORM         │
        │  COEFFICIENTS                │
        └──────────────────────────────┘
                        │
                        ▼                     ┌─504
        ┌──────────────────────────────┐
        │     PREDICT CURRENT BLOCK    │
        └──────────────────────────────┘
                        │
                        ▼                     ┌─506
        ┌──────────────────────────────┐
        │  INVERSE SCAN REPRODUCED     │
        │   TRANSFORM COEFFICIENTS     │
        └──────────────────────────────┘
                        │
                        ▼                     ┌─508
        ┌──────────────────────────────┐
        │  INVERSE QUANTIZE            │
        │  TRANSFORM COEFFICIENTS      │
        │  AND APPLY INVERSE           │
        │  TRANSFORM TO TRANSFORM      │
        │  COEFFICIENTS TO PRODUCE     │
        │  RESIDUAL BLOCK              │
        └──────────────────────────────┘
                        │
                        ▼                     ┌─510
        ┌──────────────────────────────┐
        │  COMBINE PREDICTION BLOCK    │
        │    AND RESIDUAL BLOCK        │
        └──────────────────────────────┘
```

FIG. 7

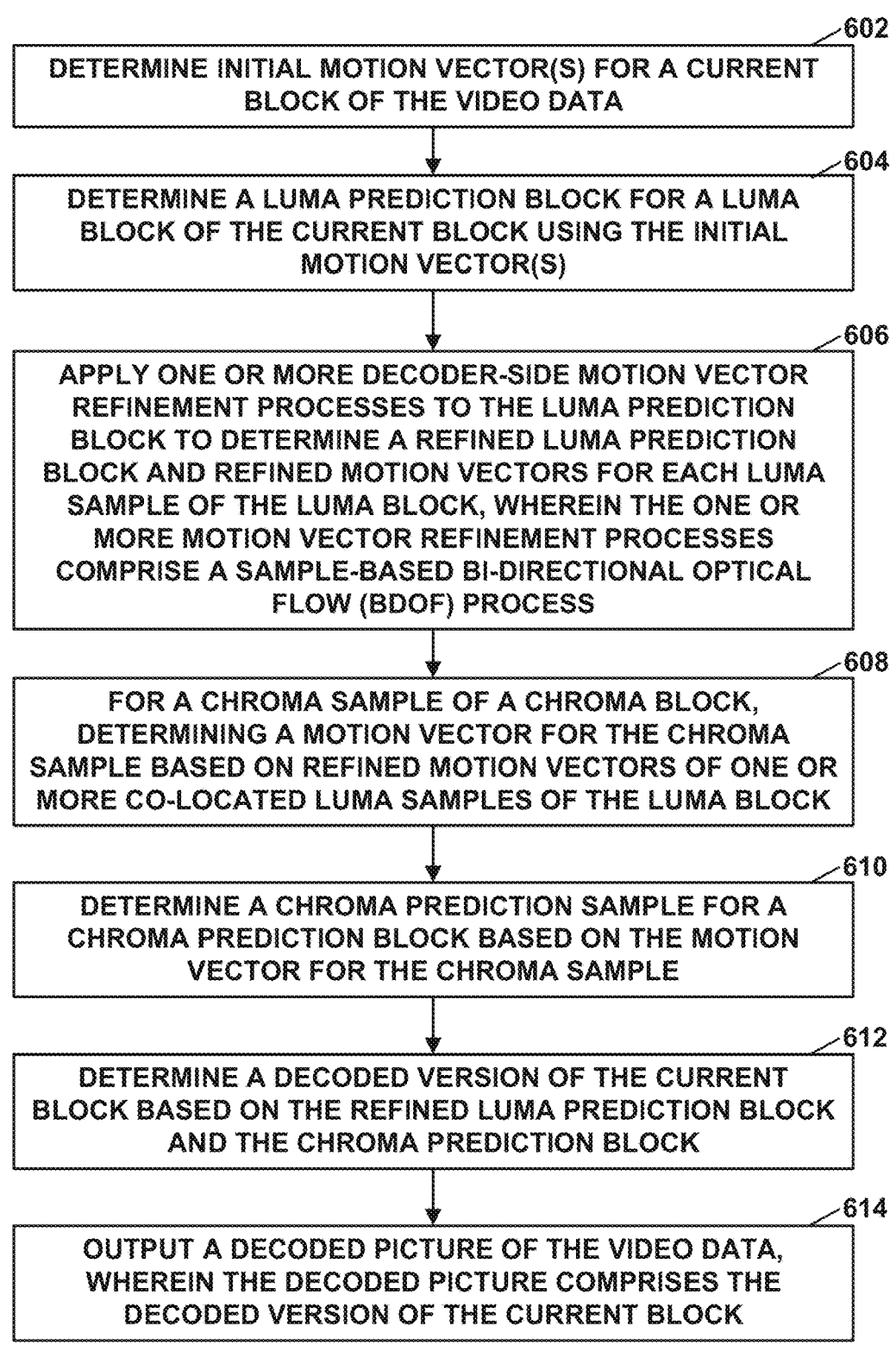

602
DETERMINE INITIAL MOTION VECTOR(S) FOR A CURRENT BLOCK OF THE VIDEO DATA

604
DETERMINE A LUMA PREDICTION BLOCK FOR A LUMA BLOCK OF THE CURRENT BLOCK USING THE INITIAL MOTION VECTOR(S)

606
APPLY ONE OR MORE DECODER-SIDE MOTION VECTOR REFINEMENT PROCESSES TO THE LUMA PREDICTION BLOCK TO DETERMINE A REFINED LUMA PREDICTION BLOCK AND REFINED MOTION VECTORS FOR EACH LUMA SAMPLE OF THE LUMA BLOCK, WHEREIN THE ONE OR MORE MOTION VECTOR REFINEMENT PROCESSES COMPRISE A SAMPLE-BASED BI-DIRECTIONAL OPTICAL FLOW (BDOF) PROCESS

608
FOR A CHROMA SAMPLE OF A CHROMA BLOCK, DETERMINING A MOTION VECTOR FOR THE CHROMA SAMPLE BASED ON REFINED MOTION VECTORS OF ONE OR MORE CO-LOCATED LUMA SAMPLES OF THE LUMA BLOCK

610
DETERMINE A CHROMA PREDICTION SAMPLE FOR A CHROMA PREDICTION BLOCK BASED ON THE MOTION VECTOR FOR THE CHROMA SAMPLE

612
DETERMINE A DECODED VERSION OF THE CURRENT BLOCK BASED ON THE REFINED LUMA PREDICTION BLOCK AND THE CHROMA PREDICTION BLOCK

614
OUTPUT A DECODED PICTURE OF THE VIDEO DATA, WHEREIN THE DECODED PICTURE COMPRISES THE DECODED VERSION OF THE CURRENT BLOCK

FIG. 8

CHROMA BDOF AND ADAPTIVE MULTI-PASS DMVR IN VIDEO CODING

This application claims the benefit of U.S. Provisional Patent Application No. 63/511,514, filed 30 Jun. 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques related to inter prediction and, more specifically, techniques related to enhancement of bi-directional optical flow (BDOF) and multi-pass decoder-side motion vector refinement (DMVR). For multi-pass DMVR, a video decoder may perform one or more of block-based bilateral matching motion vector refinement, subblock based bilateral matching motion vector refinement, subblock based BDOF motion vector refinement, adaptive decoder-side motion vector refinement, and sample-based BDOF on a luma prediction block to determine a refined motion vector for predicting the luma block, and hence a refined luma prediction block. Typically, sample-based BDOF is performed after the DMVR processes are applied to the luma prediction block. These DMVR processes are not performed separately, however, for chroma prediction blocks.

This disclosure described techniques for predicting a chroma block sample by sample using refined motion vectors determined from a sample-based BDOF applied to a co-located luma block. By determining, for a chroma sample of a chroma block that has one or more co-located luma samples in a luma block, a motion vector for the chroma sample based on refined motion vectors of the one or more co-located luma samples using sample-based BDOF, the techniques of this disclosure may improve the accuracy of chroma prediction blocks, which can result in improved rate-distortion tradeoffs in video coding.

According to an example of this disclosure, a method of decoding video data includes: determining an initial motion vector for a current block of the video data; determining a luma prediction block for a luma block of the current block using the initial motion vector; applying one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determining a motion vector for the chroma sample based on refined motion vectors of one or more co-located luma samples of the luma block; determining a chroma prediction sample for a chroma prediction block based on the motion vector for the chroma sample; determining a decoded version of the current block based on the refined luma prediction block and the chroma prediction block; and outputting a decoded picture of the video data, wherein the decoded picture comprises the decoded version of the current block.

According to an example of this disclosure, a device for decoding encoded video data includes: a memory configured to store the encoded video data; one or more processors implemented in circuitry and configured to: determine an initial motion vector for a current block of the video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples of the luma block; determine a chroma prediction sample for a chroma prediction block based on the motion vector for the chroma sample; determine a decoded version of the current block based on the refined luma prediction block and the chroma prediction block; and output a decoded picture of the video data, wherein the decoded picture comprises the decoded version of the current block.

According to an example of this disclosure, a device for encoding video data includes a memory configured to store the video data; one or more processors implemented in circuitry and configured to: determine an initial motion vector for a current block of the video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples; determine a chroma prediction sample for a chroma prediction block based on the motion vector for the chroma sample; determine a decoded version of the current block based on the refined luma prediction block and the chroma prediction block; store a decoded picture of the video data, wherein the decoded picture comprises the decoded version of the current block; and use the decoded picture of the video data to encode a subsequent picture of video data.

According to an example of this disclosure, a computer-readable storage medium stores instructions that when executed by one or more processors cause the one or more processors to: determine an initial motion vector for a current block of video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples of the luma block; determine a chroma prediction sample for a chroma prediction block based on the motion vector for the chroma sample; determine a decoded version of the current block based on the refined luma prediction block and the chroma prediction block; and output a decoded picture of the video data, wherein the decoded picture comprises the decoded version of the current block.

The details of one or more examples are set forth in the accompanying drawings and the description below. Other features, objects, and advantages will be apparent from the description, drawings, and claims.

BRIEF DESCRIPTION OF DRAWINGS

FIG. 7 is a flowchart illustrating an example process for decoding a current block in accordance with the techniques of this disclosure.

FIG. 8 is a flowchart illustrating an example process for decoding a current block of video data in accordance with the techniques of this disclosure.

DETAILED DESCRIPTION

Figure 1:
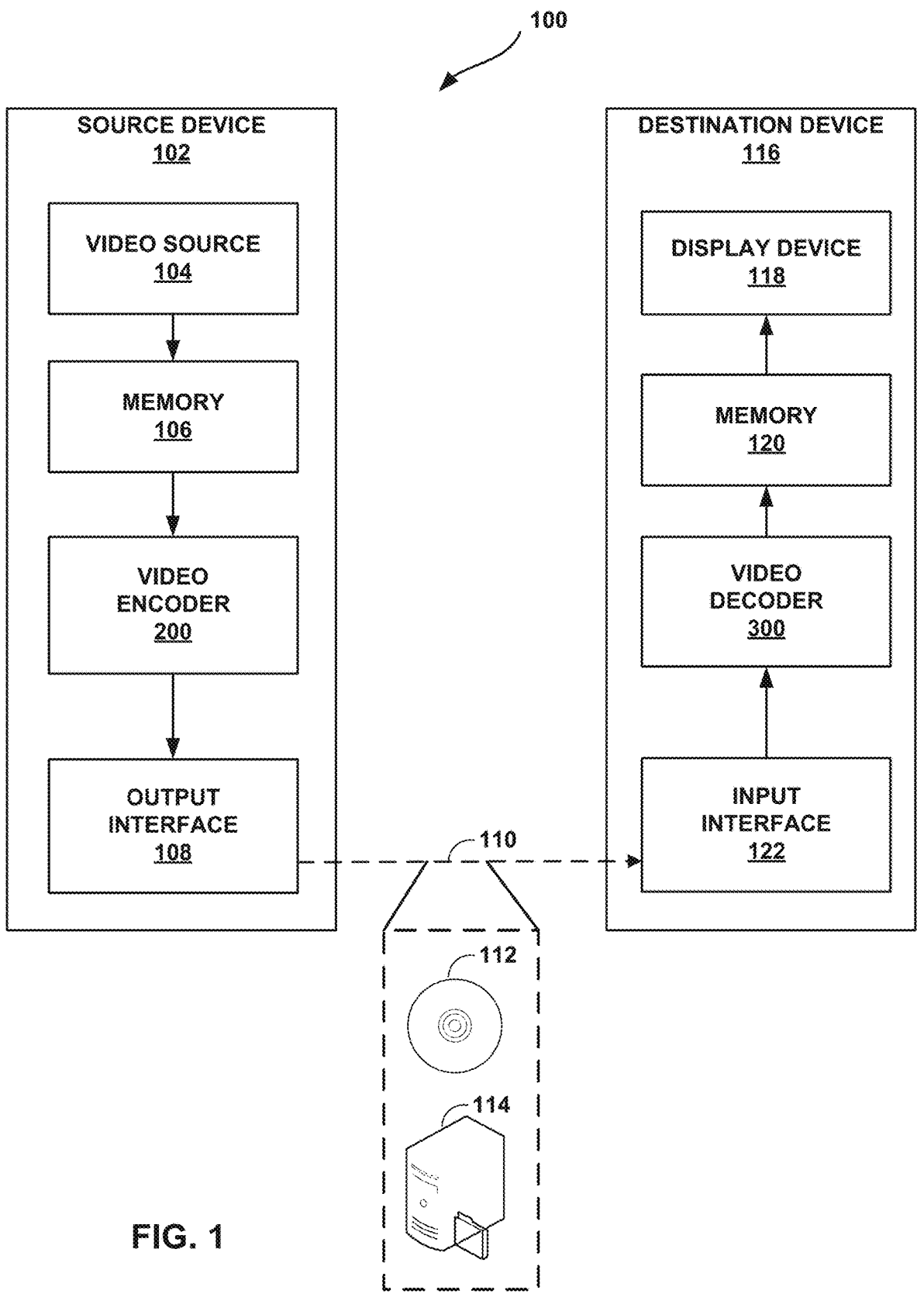
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to inter prediction and, more specifically, techniques related to enhancement of bi-directional optical flow (BDOF) and multi-pass decoder-side motion vector refinement (DMVR). For multi-pass DMVR, a video decoder may perform one or more of block-based bilateral matching motion vector refinement, subblock based bilateral matching motion vector refinement, subblock based BDOF motion vector refinement, adaptive decoder-side motion vector refinement, and sample-based BDOF on a luma prediction block to determine a refined motion vector for predicting the luma block, and hence a refined luma prediction block. Typically, sample-based BDOF is performed after the DMVR processes are applied to the luma prediction block. These DMVR processes are not performed separately, however, for chroma prediction blocks.

This disclosure describes techniques for predicting a chroma block sample by sample using refined motion vectors determined from a sample-based BDOF applied to a co-located luma block. By determining, for a chroma sample of a chroma block that has one or more co-located luma samples in a luma block, a motion vector for the chroma sample based on refined motion vectors of the one or more co-located luma samples using sample-based BDOF, the techniques of this disclosure may improve the accuracy of chroma prediction blocks, which can result in improved rate-distortion tradeoffs in video coding.

For ease of explanation, this disclosure may describe some techniques as being performed by a video decoder. Unless stated to the contrary, however, it may be assumed that these same techniques, or reciprocal techniques, may also be performed by a video encoder.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for BDOF. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for BDOF. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively.

Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network.

Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses BDOF processes.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes.

Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS).

Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Video encoder 200 and video decoder 300 may be configured to perform one or more BDOF processes. A BDOF process is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement ($v_x$, $v_y$) is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = \left(I^{(k)}(i+1, j) - I^{(k)}(i-1, j)\right) \gg shift1$$

$$\frac{\partial I^{(k)}}{\partial y}(i, j) = \left(I^{(k)}(i, j+1) - I^{(k)}(i, j-1)\right) \gg shift1$$

where $I^{(k)}(i,j)$ are the sample value at coordinate (i,j) of the prediction signal in list k, k=0,1, and shift1 is calculated based on the luma bit depth, bitDepth, as shift1=max(2, 14−bitDepth).

Then, the auto- and cross-correlation of the gradients, $S_1$, $S_2$, $S_3$, $S_5$ and $S_6$, are calculated as $$S_1 = \sum_{(i,j)\in\Omega} \psi_x(i, j)\cdot\psi_x(i, j), \; S_3 = \sum_{(i,j)\in\Omega} \theta(i, j)\cdot\psi_x(i, j)$$

$$S_2 = \sum_{(i,j)\in\Omega} \psi_x(i, j)\cdot\psi_y(i, j)$$

$$S_5 = \sum_{(i,j)\in\Omega} \psi_y(i, j)\cdot\psi_y(i, j) \; S_6 = \sum_{(i,j)\in\Omega} \theta(i, j)\cdot\psi_y(i, j)$$

where $$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

where $\Omega$ is a 6×6 window around the 4×4 sub-block, and the values of $n_a$ and $n_b$ are set equal to min(5, bitDepth−7) and min(8, bitDepth−4), respectively.

The motion refinement ($v_x$, $v_y$) is then derived using the cross- and auto-correlation terms using the following:

$$v_x = S_1 > 0? \; clip3\left(-th'_{BIO}, th'_{BIO}, -\left((S_3 \cdot 2^{n_b-n_a}) \gg \lfloor\log_2 S_1\rfloor\right)\right):0$$

$$v_y = S_5 > 0? \; clip3\left(-th'_{BIO}, th'_{BIO}, \right.$$

$$\left. -\left(\left(S_6 \cdot 2^{n_b-n_a} - \left((v_x S_{2,m}) \ll n_{S_2} + v_x S_{2,s}\right)/2\right) \gg \lfloor\log_2 S_5\rfloor\right)\right):0$$

where $$S_{2,m} = S_2 \gg n_{S_2}, \; S_{2,s} = S_2 \; \& \; \left(2^{n_{S_2}} - 1\right), \; th'_{BIO} = 2^{13-BD}.$$

is the floor function, and $n_{S_2}$=12.

Based on the motion refinement and the gradients, the following adjustment is calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)\bigg/ 2\right) +$$

$$rnd\left(\left(v_y\left(\frac{\partial I^{(1)}(x, y)}{\partial y} - \frac{\partial I^{(0)}(x, y)}{\partial y}\right)\right)\bigg/ 2\right)$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) \gg shift$$

These values are selected such that the multipliers in the BDOF process do not exceed 15-bit, and the maximum bit-width of the intermediate parameters in the BDOF process is kept within 32-bit.

Figure 2:
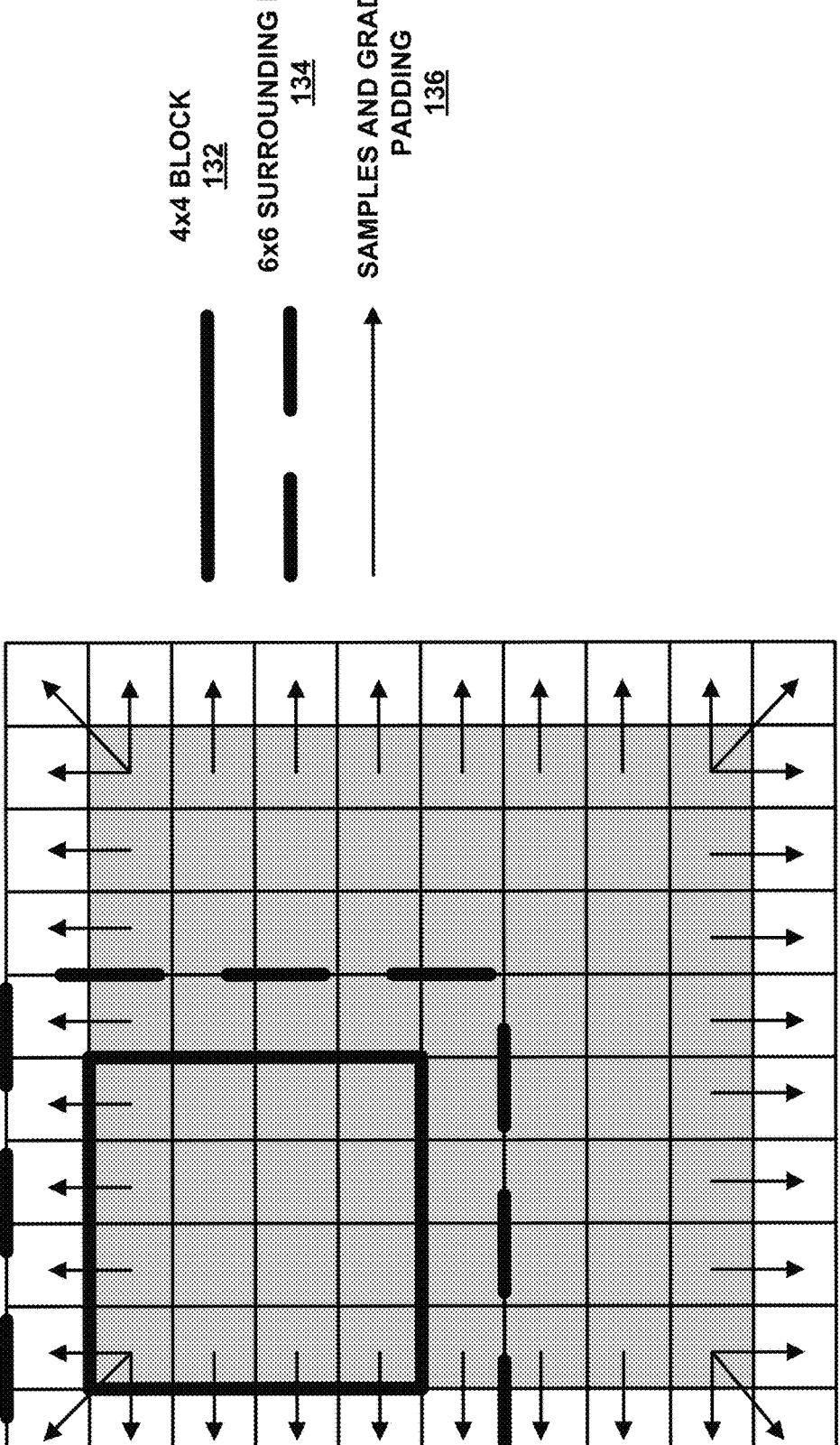
FIG. 2 shows an example of an extended coding unit (CU) region used in bi-direction optical flow (BDOF).

In order to derive the gradient values, some prediction samples $I^{(k)}(i,j)$ in list k (k=0,1) that are outside of the current CU boundaries may need to be generated. As depicted in FIG. 2, the BDOF process uses one extended row and column around the CU's boundaries. In FIG. 2, the CU is shown as 4×4 block 132, and the one extended row and column is shown as the 6×6 surrounding region 134 around 4×4 block 132. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). Arrows 136 show which prediction samples from 4×4 block 196 are used to determine a particular sample in 6×6 surrounding region 134. These extended sample values may be used only in a gradient calculation. For the remaining steps in the BDOF process, if any sample and gradient values outside of the CU boundaries are needed, then those values are padded (e.g., repeated) from nearest neighbors.

Video encoder 200 and video decoder 300 may use a BDOF process to refine the bi-prediction signal of a CU at the 4×4 subblock level. Video decoder 300 applies the BDOF process to a CU if the CU satisfies all the following conditions:

The CU is coded using "true" bi-prediction mode, i.e., one of the two reference pictures is prior to the current picture in display order and the other is after the current picture in display order.

The CU is not coded using affine mode or the ATMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

Video encoder 200 and video decoder 300 may be configured to perform multi-pass DMVR. In the first pass, bilateral matching (BM) is applied to the coding block. In the second pass, BM is applied to each 16×16 subblock within the coding block. In the third pass, a motion vector in each 8×8 subblock is refined by applying a BDOF process. The refined motion vectors are stored for both spatial and temporal motion vector prediction.

For a first pass, video encoder 200 and video decoder 300 may be configured to perform block based bilateral matching motion vector refinement. In the first pass, a refined motion vector is derived by applying BM to a coding block. Similar to DMVR, in bi-prediction operation, a refined motion vector is searched around the two initial motion vectors (MV0 and MV1) in the reference picture lists L0 and L1. The refined motion vectors (MV0_pass1 and MV1_pass1) are derived around the initiate motion vectors based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, mean-removal SAD (MRSAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of 3×3 search pattern, and video decoder 300 continues to search for the minimum cost until reaching the end of the search range.

The existing fractional sample refinement is further applied to derive the final deltaMV. Video decoder 300 derives the refined motion vectors after the first pass as follows:

MV0_pass1=MV0+deltaMV

MV1_pass1=MV1−deltaMV

For a second pass, video encoder 200 and video decoder 300 may be configured to perform subblock based bilateral matching motion vector refinement. In the second pass, a refined motion vector is derived by applying BM to a 16×16 grid subblock. For each subblock, a refined motion vector is searched around the two motion vectors (MV0_pass1 and MV1_pass1), obtained on the first pass, in the reference picture list L0 and L1. The refined motion vectors (MV0_pass2(sbIdx2) and MV1_pass2(sbIdx2)) are derived based on the minimum bilateral matching cost between the two reference subblocks in L0 and L1.

For each subblock, BM performs full search to derive integer sample precision intDeltaMV The full search has a search range [−sHor, sHor] in horizontal direction and [−sVer, sVer] in vertical direction, wherein, the values of sHor and sVer are determined by the block dimension, and the maximum value of sHor and sVer is 8.

Figure 3:
FIG. 3 illustrates an example diamond search region for multi-pass decoder side motion refinement.
Figure 3:

The bilateral matching cost is calculated by applying a cost factor to the sum of absolute transformed differences (SATD) cost between two reference subblocks as: bilCost=satdCost*costFactor. FIG. 3 illustrates an example diamond search region 150 for multi-pass decoder side motion refinement. The search area (2*sHor+1)*(2*sVer+1) is divided into 5 diamond shaped search regions, as shown in FIG. 3. Each search region is assigned a costFactor, which is determined by the distance (intDeltaMV) between each search point and the starting MV. Each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated. Otherwise, the int-pel full search continues to the next search region until all search points are examined.

The existing VVC DMVR fractional sample refinement is further applied to derive the final deltaMV(sbIdx2). Video decoder 300 derives the refined motion vectors at the second pass as follows:

MV0_pass2(sbIdx2)=MV0_pass1+deltaMV(sbIdx2)

MV1_pass2(sbIdx2)=MV1_pass1−deltaMV(sbIdx2).

For a third pass, video encoder 200 and video decoder 300 may be configured to perform subblock based BDOF motion vector refinement. In the third pass, a refined motion vector is derived by applying a BDOF process to an 8×8 grid subblock. For each 8×8 subblock, BDOF refinement is applied to derive scaled Vx and Vy without clipping starting from the refined motion vector of the parent subblock of the second pass. The derived bioMv(Vx, Vy) is rounded to 1/16 sample precision and clipped between −32 and 32.

Video decoder 300 derives the refined motion vectors (MV0_pass3(sbIdx3) and MV1_pass3(sbIdx3)) at the third pass as follows:

MV0_pass3(sbIdx3)=MV0_pass2(sbIdx2)+bioMv

MV1_pass3(sbIdx3)=MV1_pass2(sbIdx2)−bioMv

In all aforementioned sub-clauses, when wrap around motion compensation is enabled, the motion vectors shall be clipped with wrap around offset taken into consideration.

Video encoder 200 and video decoder 300 may be configured to perform adaptive DMVR. An adaptive DMVR process is an extension of multi-pass DMVR which consists of the two new merge modes to refine motion vector only in one direction, either L0 or L1, of the bi-prediction for the merge candidates that meet the DMVR conditions. The multi-pass DMVR process is applied for the selected merge candidate to refine the motion vectors, however either MVD0 or MVD1 is set to zero in the $1^{st}$ pass (i.e., PU level) DMVR.

The merge candidates for the new merge mode are derived from spatial neighboring coded blocks, TMVPs, non-adjacent blocks, HMVPs, pair-wise candidate, similar as in the regular merge mode. The difference is that only those meet DMVR conditions are added into the candidate list. The same merge candidate list is used by the two new merge modes. If the list of BM candidates contains the inherited BCW weights and DMVR process is unchanged except the computation of the distortion is made using MRSAD or MRSATD if the weights are non-equal and the bi-prediction is weighted with BCW weights. Merge index is coded as in regular merge mode.

Video encoder 200 and video decoder 300 may be configured to perform sample-based BDOF. In the sample-based BDOF, instead of deriving motion refinement (Vx, Vy) on a block basis, the refinement is performed per sample.

In one example implementation of multi-pass DMVR, video decoder 300 may, for the first pass, perform block based bilateral matching motion vector refinement or adaptive decoder-side motion vector refinement. For the second and third passes, video decoder 300 may perform subblock based bilateral matching motion vector refinement and subblock based BDOF motion vector refinement, respectively. After the multi-pass DMVR processes, video decoder 300 may additionally perform sample-based BDOF.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

Existing techniques may exhibit some problems. In ECM, the inter prediction samples of a luma block can be further refined through sample-based BDOF. Samples of the co-located chroma block, however, are not refined through the same process and always bypass sample-based BDOF. Additionally, when adaptive DMVR is used in multi-pass DMVR, only one motion vector of a bi-predicted block can be refined. However, this constrain is not applied to the third pass of multi-pass DMVR and sample-based BDOF, resulting in a design inconsistency. This disclosure describes techniques to address these issues.

Video encoder 200 and video decoder 300 may be configured to perform a sample-based chroma BDOF. In some examples, the sample-based BDOF (as described above) is applied directly to a chroma component of an inter prediction block. In some examples, the same sampled-based BDOF as described in the example above is applied except that motion refinement (Vx, Vy) of each chroma sample is not derived but is inferred directly from co-located luma samples. The inference process may differ depending on color format, as follows:

For 4:4:4 color format, the motion refinement of a chroma sample located at (Px, Py) in a chroma block is inferred from the motion refinement $(Vx, Vy)_{(Px, Py)}$ located at (Px, Py) in the co-located luma block.

For 4:2:2 color format, the motion refinement of a chroma sample located at (Px, Py) in a chroma block could be derived from either one of the followings:

(a) the motion refinement $(Vx, Vy)_{(2*Px, Py)}$ located at (2*Px, Py) in the co-located luma block;

(b) the motion refinement $(Vx, Vy)_{(2*Px+1, Py)}$ located at (2*Px+1, Py) in the co-located luma block;

(c) the average of two motion refinements, that is, $((Vx, Vy)_{(2*Px, Py)}+(Vx, Vy)_{(2*Px+1, Py)}+(1, 1))>>1$.

The result of each of the aforementioned processes is denoted as (Cx, Cy) and (Cx>>1, Cy) is the motion refinement of the chroma sample located at (Px, Py) in a chroma block.

For 4:2:0 color format, the motion refinement of a chroma sample located at (Px, Py) in a chroma block could be derived from either one of the followings:

(a) the motion refinement $(Vx, Vy)_{(2*Px, 2*Py)}$ located at (2*Px, 2*Py) in the co-located luma block;

(b) the motion refinement $(Vx, Vy)_{(2*Px+1, 2*Py)}$ located at (2*Px+1, 2*Py) in the co-located luma block;

(c) the motion refinement $(Vx, Vy)_{(2*Px, 2*Py+1)}$ located at (2*Px, 2*Py+1) in the co-located luma block;

(d) the motion refinement (Vx, Vy)$_{(2*Px,+1\ \ 2*Py+1)}$ located at (2*Px+1, Py+1) in the co-located luma block;

(e) the average of two motion refinements, that is, ((Vx, Vy)$_{(2*Px,\ 2*Py)}$+(Vx, Vy)$_{(2*Px+1,\ 2*Py)}$+(1, 1))>>1.

(f) the average of two motion refinements, that is, ((Vx, Vy)$_{(2*Px,\ 2*Py)}$+(Vx, Vy)$_{(2*Px,\ 2*Py+1)}$+(1, 1))>>1.

(g) the average of two motion refinements, that is, ((Vx, Vy)$_{(2*Px,\ 2*Py)}$+(Vx, Vy)$_{(2*Px+1,\ 2*Py+1)}$+(1, 1))>>1.

(h) the average of two motion refinements, that is, ((Vx, Vy)$_{(2*Px+1,\ 2*Py)}$+(Vx, Vy)$_{(2*Px,\ 2*Py+1)}$+(1, 1))\>>1.

(i) the average of four motion refinements, that is ((Vx, Vy)$_{(2*Px,\ \ 2*Py)}$+(Vx, Vy)$_{(2*Px+1,\ \ \ 2*Py)}$+(Vx, Vy)$_{(2*Px,\ 2*Py+1)}$+(Vx, Vy)$_{(2*Px+1,\ 2*Py+1)}$+(2, 2))>>2.

The result of each of the aforementioned processes is denoted as (Cx, Cy) and (Cx>>1, Cy>>1) is the motion refinement of the chroma sample located at (Px, Py) in a chroma block.

Video encoder 200 and video decoder 300 may be configured to perform a constrained BDOF-derived motion vector in Multi-pass DMVR.

In some examples, when adaptive DMVR is used in the process of multi-pass DMVR, the derived BDOF motion vector (e.g., as described above) is applied only to either on of MV0_pass3 and MV1_pass3, depending on whichever of MVD0 and MVD1 is constrained with zero MVD by adaptive DMVR.

When adaptive DMVR put zero-MVD constraint on L0 motion, then:

MV0_pass3(sbIdx3)=MV0_pass2(sbIdx2)
MV1_pass3(sbIdx3)=MV1_pass2(sbIdx2)−bioMv

When adaptive DMVR put zero-MVD constraint on L1 motion, then:

MV0_pass3(sbIdx3)=MV0_pass2(sbIdx2)+bioMv
MV1_pass3(sbIdx3)=MV1_pass2(sbIdx2)

Video encoder 200 and video decoder 300 may be configured to perform constrained sample-based BDOF. The BDOF offset value (e.g., b(x,y) above) is subject to change according to the use of adaptive DMVR.

In some examples, the derivation of b(x,y) is extended to covering the use of adaptive DMVR, as follows:

When adaptive DMVR put zero-MVD constraint on L0 motion, then:

$$b(x, y) = rnd\left(\left(v_x\left(\frac{\partial I^{(1)}(x, y)}{\partial x}\right)\right)/2\right) + rnd\left(\left(v_y\left(\frac{\partial I^{(1)}(x, y)}{\partial y}\right)\right)/2\right)$$

When adaptive DMVR put zero-MVD constraint on L1 motion, then:

$$b(x, y) = rnd\left(\left(v_x\left(-\frac{\partial I^{(0)}(x, y)}{\partial x}\right)\right)/2\right) + rnd\left(\left(v_y\left(-\frac{\partial I^{(0)}(x, y)}{\partial y}\right)\right)/2\right)$$

In some examples, video decoder 300 may set the gradient values of one prediction hypothesis (e.g., either L0's or L1's depending on the use of adaptive DMVR) and thus the equation of b(x,y) need not be changed/extended.

When adaptive DMVR put zero-MVD constraint on L0 motion, then the gradient vector, $$\left(\frac{\partial I^{(0)}}{\partial x}(i, j), \frac{\partial I^{(0)}}{\partial x}(i, j)\right),$$

of each luma and chroma sample is forced to be zero and thus need not be computed for complexity reduction.

When adaptive DMVR put zero-MVD constraint on L1 motion, then the gradient vector $$\left(\frac{\partial I^{(1)}}{\partial x}(i, j), \frac{\partial I^{(1)}}{\partial x}(i, j)\right),$$

of each luma and chroma sample is forced to be zero and thus need not be computed for complexity reduction.

Figure 4:
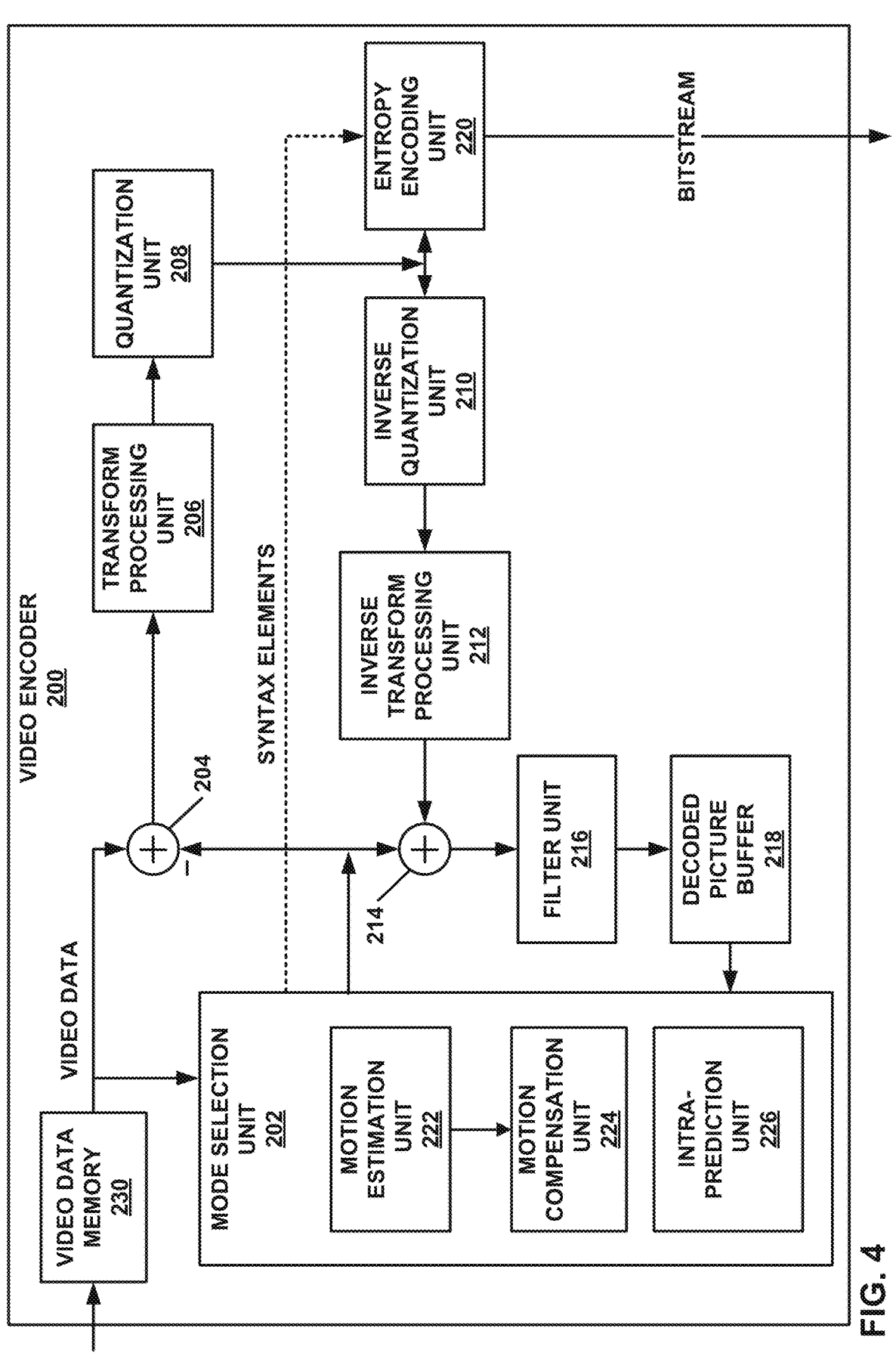
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such.

Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors motion vectors that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202.

Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units.

Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block.

For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218.

Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data.

In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector and reference picture for a luma coding block need not be repeated for identifying a motion vector and reference picture for the chroma blocks. Rather, the motion vector for the luma coding block may be scaled to determine the motion vector for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a block of the video data is encoded in an inter prediction mode and apply sample-based BDOF to samples of a chroma component of the block.

Figure 5:
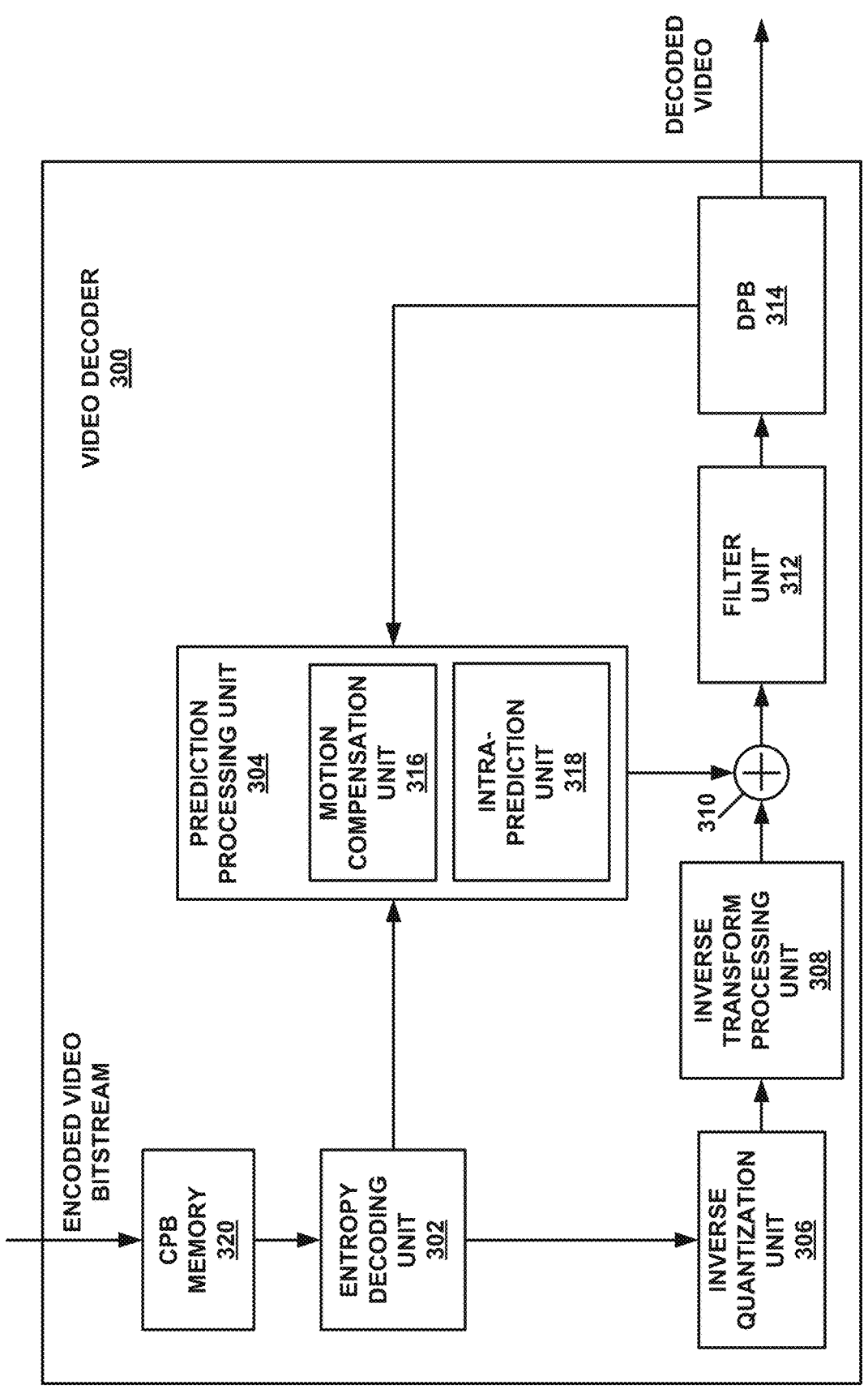
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis.

Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks.

For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that a block of the video data is encoded in an inter prediction mode and apply sample-based BDOF to samples of a chroma component of the block.

Figure 6:
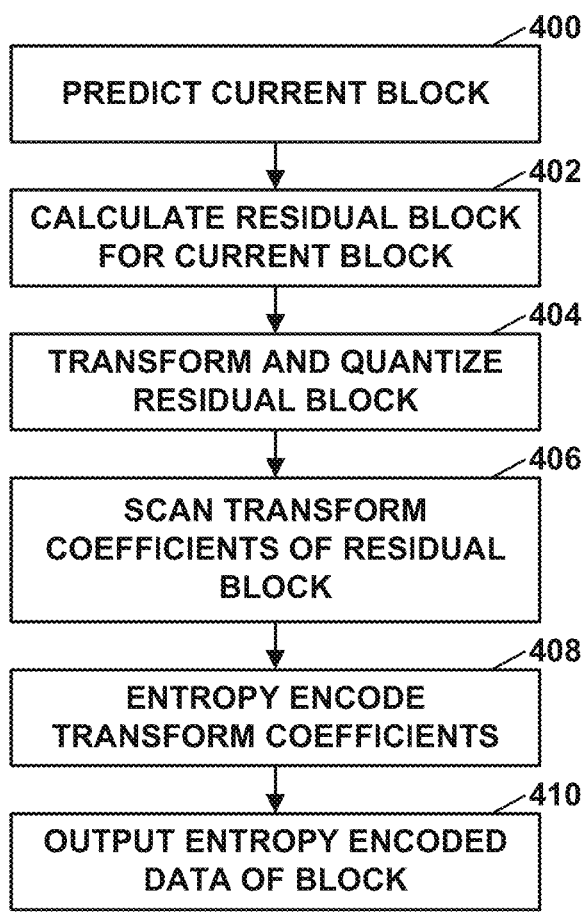
FIG. 6 is a flowchart illustrating an example process for encoding a current block in accordance with the techniques of this disclosure.

FIG. 6 is a flowchart illustrating an example process for encoding a current block in accordance with the techniques of this disclosure. The current block may be or include a current CU. Although described with respect to video encoder 200 (FIGS. 1 and 4), it should be understood that other devices may be configured to perform a process similar to that of FIG. 6.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 7 is a flowchart illustrating an example process for decoding a current block of video data in accordance with the techniques of this disclosure. The current block may be or include a current CU. Although described with respect to video decoder 300 (FIGS. 1 and 5), it should be understood that other devices may be configured to perform a process similar to that of FIG. 7.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

FIG. 8 is a flowchart illustrating an example process for decoding a current block of video data in accordance with the techniques of this disclosure. The current block may be or include a current CU. Although described with respect to video decoder 300 (FIGS. 1 and 5), it should be understood that other devices may be configured to perform a process similar to that of FIG. 8. For example, the video decoding loop of video encoder 200 may also perform the techniques of FIG. 8.

Video decoder 300 determine initial motion vector(s) for a current block of the video data (602). Video decoder 300 may, for example, determine the initial motion vector using an AMVP or a merge process. In some examples, the current block may be a bi-predicted block that has two motion vectors. Video decoder 300 determines a luma prediction block for a luma block of the current block using the initial motion vector (604).

Video decoder 300 applies one or more decoder-side motion vector refinement processes to the luma prediction block to determine a refined luma prediction block and refined motion vectors for each luma sample of the luma block, wherein the one or more motion vector refinement processes comprise a sample-based bi-directional optical flow (BDOF) process (606). To apply the one or more decoder-side motion vector refinement processes to the luma prediction block to determine the refined luma prediction block and the refined motion vectors for each luma sample of the luma block, video decoder 300 may apply a block-based bilateral matching motion vector refinement process before the BODF process. Video decoder 300 may also apply a sub-block-based bilateral matching motion vector refinement process after the block-based bilateral matching motion vector refinement process and before the BODF process.

For a chroma sample of a chroma block, video decoder 300 determines a motion vector for the chroma sample based on refined motion vectors of one or more co-located luma samples of the luma block (608). In some examples, to determine the motion vector for the chroma sample based on the refined motion vectors of the one or more co-located luma samples, video decoder 300 may, for example, select one of the refined motion vectors of the one or more co-located luma samples to be the motion vector for the chroma block. In other examples, video decoder 300 may average at least two of the refined motion vectors of the one or more co-located luma samples to determine the motion vector for the chroma block. Regardless of whether selecting or averaging, video decoder 300 may scale the one of the refined motion vectors of the one or more co-located luma samples based on a chroma sub-sampling format of the video data.

Video decoder 300 determines a chroma prediction sample for a chroma prediction block based on the motion vector for the chroma sample (610). Video decoder 300 may additionally perform sample-based BDOF on the chroma prediction block.

Video decoder 300 determines a decoded version of the current block based on the refined luma prediction block and the chroma prediction block (612). Video decoder 300 outputs a decoded picture of the video data, wherein the decoded picture comprises the decoded version of the current block (614). Video decoder 300 may, for example, output the decoded picture for display, transmission, or storage. When the process of FIG. 8 is being performed as part of a video encoding process, the decoded picture may be stored for use in encoding other pictures of video data.

The following numbered clauses illustrate one or more aspects of the devices and techniques described in this disclosure.

Clause 1A: A method of coding video data, the method comprising: determining that a block of the video data is encoded in an inter prediction mode; applying sample-based bi-directional optical flow (BDOF) to samples of a chroma component of the block.

Clause 2A: The method of clause 1, further comprising: determining a motion vector for the block; and applying the sample-based BDOF to the samples of the chroma component of the block using the motion vector.

Clause 3A: The method of clause 2A, further comprising: scaling the motion vector prior to applying the sample-based BDOF.

Clause 4A: The method of any of clauses 1A-3A, wherein coding comprises decoding.

Clause 5A: The method of any of clauses 1A-3A, wherein coding comprises encoding.

Clause 6A: A device for coding video data, the device comprising one or more means for performing the method of any of clauses 1A-5A.

Clause 7A: The device of clause 5A, wherein the one or more means comprise one or more processors implemented in circuitry.

Clause 8A: The device of any of clauses 5A and 6A, further comprising a memory to store the video data. Clause 9A: The device of any of clauses 5A-8A, further comprising a display configured to display decoded video data.

Clause 10A: The device of any of clauses 5A-9A, wherein the device comprises one or more of a camera, a computer, a mobile device, a broadcast receiver device, or a set-top box.

Clause 11A: The device of any of clauses 5A-10A, wherein the device comprises a video decoder.

Clause 12A: The device of any of clauses 5A-11A, wherein the device comprises a video encoder.

Clause 13A: A computer-readable storage medium having stored thereon instructions that, when executed, cause one or more processors to perform the method of any of clauses 1A-5A.

Clause 1B: A method of decoding video data, the method comprising: determining an initial motion vector for a current block of the video data; determining a luma prediction block for a luma block of the current block using the initial motion vector; applying one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determining a motion vector for the chroma sample based on refined motion vectors of one or more co-located luma samples of the luma block; determining a chroma prediction sample for a chroma prediction block based on the motion vector for the chroma sample; determining a decoded version of the current block based on the refined luma prediction block and the chroma prediction block; and outputting a decoded picture of the video data, wherein the decoded picture comprises the decoded version of the current block.

Clause 2B: The method of clause 1B, wherein determining the motion vector for the chroma sample based on the refined motion vectors of the one or more co-located luma samples comprises selecting one of the refined motion vectors of the one or more co-located luma samples to be the motion vector for the chroma block.

Clause 3B: The method of clause 2B, wherein determining the motion vector for the chroma sample based on the refined motion vectors of the one or more co-located luma samples of the luma block comprises scaling the one of the refined motion vectors of the one or more co-located luma samples.

Clause 4B: The method of clause 1B, wherein determining the motion vector for the chroma sample based on the refined motion vectors of the one or more co-located luma samples comprises averaging at least two of the refined motion vectors of the one or more co-located luma samples to determine the motion vector for the chroma block.

Clause 5B: The method of any of clauses 1B-4B, wherein applying the one or more decoder-side motion vector refinement processes to the luma prediction block to determine the refined luma prediction block and the refined motion vectors for each luma sample of the luma block comprises applying a block-based bilateral matching motion vector refinement process before the BODF process.

Clause 6B: The method of clause 5B, wherein applying the one or more decoder-side motion vector refinement processes to the luma prediction block to determine the refined luma prediction block and the refined motion vectors for each luma sample of the luma block comprises applying a sub-block-based bilateral matching motion vector refinement process after the block-based bilateral matching motion vector refinement process and before the BODF process.

Clause 7B: The method of any of clauses 1B-6B, further comprising: performing a sample-based BDOF process on the chroma prediction block.

Clause 8B: A device for decoding encoded video data, the device comprising: a memory configured to store the encoded video data; one or more processors implemented in circuitry and configured to: determine an initial motion vector for a current block of the video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples of the luma block; determine a chroma prediction sample for a chroma prediction block based on the motion vector for the chroma sample; determine a decoded version of the current block based on the refined luma prediction block and the chroma prediction block; and output a decoded picture of the video data, wherein the decoded picture comprises the decoded version of the current block.

Clause 9B: The device of clause 8B, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

Clause 10B: The device of clause 8B, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

Clause 11B: The device of any of clauses 8B-10B, wherein to apply the one or more decoder-side motion vector refinement processes to the luma prediction block to determine the refined luma prediction block and the refined motion vectors for each luma sample of the luma block, the one or more processors are further configured to apply a block-based bilateral matching motion vector refinement process before the BODF process.

Clause 12B: The device of clause 11B, wherein to apply the one or more decoder-side motion vector refinement processes to the luma prediction block to determine the refined luma prediction block and the refined motion vectors for each luma sample of the luma block, the one or more processors are further configured to apply a sub-block-based bilateral matching motion vector refinement process after the block-based bilateral matching motion vector refinement process and before the BODF process.

Clause 13B: The device of any of clauses 8B-12B, wherein the current block comprises a bi-predicted block.

Clause 14B: The device of any of clauses 8B-13B, further comprising a display configured to display the decoded picture.

Clause 15B: The device of any of clauses 8B-14B, wherein the device comprises one or more of a camera, a computer, a mobile device, a broadcast receiver device, or a set-top box.

Clause 16B: The device of any of clauses 8B-14B, wherein the device comprises a wireless communication device, further comprising a receiver configured to receive the encoded video data.

Clause 17B: The device of clause 16B, wherein the wireless communication device comprises a telephone handset and wherein the receiver is configured to demodulate, according to a wireless communication standard, a signal comprising the encoded video data.

Clause 18B: A device for encoding video data, the device comprising: a memory configured to store the video data; one or more processors implemented in circuitry and configured to: determine an initial motion vector for a current block of the video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples; determine a chroma prediction sample for a chroma prediction block based on the motion vector for the chroma sample; determine a decoded version of the current block based on the refined luma prediction block and the chroma prediction block; store a decoded picture of the video data, wherein the decoded picture comprises the decoded version of the current block; and use the decoded picture of the video data to encode a subsequent picture of video data.

Clause 19B: The device of clause 18B, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

Clause 20B: The device of clause 18B, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

Clause 21B: The device of any of clauses 18B-20B, wherein to apply the one or more decoder-side motion vector refinement processes to the luma prediction block to determine the refined luma prediction block and the refined motion vectors for each luma sample of the luma block, the one or more processors are further configured to apply a block-based bilateral matching motion vector refinement process before the BODF process.

Clause 22B: The device of clause 21B, wherein to apply the one or more decoder-side motion vector refinement processes to the luma prediction block to determine the refined luma prediction block and the refined motion vectors for each luma sample of the luma block, the one or more processors are further configured to apply a sub-block-based bilateral matching motion vector refinement process after the block-based bilateral matching motion vector refinement process and before the BODF process.

Clause 23B: The device of any of clauses 18B-22B, wherein the current block comprises a bi-predicted block.

Clause 24B: The device of any of clauses 18B-23B, wherein the device comprises a wireless communication device, further comprising a transmitter configured to transmit encoded video data.

Clause 25B: The device of clause 24B, wherein the wireless communication device comprises a telephone handset and wherein the transmitter is configured to modulate, according to a wireless communication standard, a signal comprising the encoded video data.

Clause 26B: A computer-readable storage medium storing instructions that when executed by one or more processors cause the one or more processors to: determine an initial motion vector for a current block of video data; determine a luma prediction block for a luma block of the current block using the initial motion vector; apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process; for a chroma sample of a chroma block, determine a motion vector for the chroma sample based on refined motion vectors of one or more co-located luma samples of the luma block; determine a chroma prediction sample for a chroma prediction block based on the motion vector for the chroma sample; determine a decoded version of the current block based on the refined luma prediction block and the chroma prediction block; and output a decoded picture of the video data, wherein the decoded picture comprises the decoded version of the current block.

Clause 27B: The computer-readable storage medium of clause 26B, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

Clause 28B: The computer-readable storage medium of clause 26B, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

Clause 29B: The computer-readable storage medium of any of clauses 26B-28B, wherein to apply the one or more decoder-side motion vector refinement processes to the luma prediction block to determine the refined luma prediction block and the refined motion vectors for each luma sample of the luma block, the one or more processors are further configured to apply a block-based bilateral matching motion vector refinement process before the BODF process.

Clause 30B: The computer-readable storage medium of clause 29B, wherein to apply the one or more decoder-side motion vector refinement processes to the luma prediction block to determine the refined luma prediction block and the refined motion vectors for each luma sample of the luma block, the one or more processors are further configured to apply a sub-block-based bilateral matching motion vector refinement process after the block-based bilateral matching motion vector refinement process and before the BODF process.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining an initial motion vector for a current block of the video data;

determining a luma prediction block for a luma block of the current block using the initial motion vector;

applying one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process, wherein applying the one or more decoder-side motion vector refinement processes to the luma prediction block to determine the refined luma prediction block and the refined motion vectors for each luma sample of the luma block comprises:

applying a block-based bilateral matching motion vector refinement process before the BDOF process; and applying a sub-block-based bilateral matching motion vector refinement process after the block-based bilateral matching motion vector refinement process and before the BDOF process;

for a chroma sample of a chroma block, determining a motion vector for the chroma sample based on refined motion vectors of one or more co-located luma samples of the luma block;

determining a chroma prediction sample for a chroma prediction block based on the motion vector for the chroma sample;

determining a decoded version of the current block based on the refined luma prediction block and the chroma prediction block; and outputting a decoded picture of the video data, wherein the decoded picture comprises the decoded version of the current block.

2. The method of claim 1, wherein determining the motion vector for the chroma sample based on the refined motion vectors of the one or more co-located luma samples comprises selecting one of the refined motion vectors of the one or more co-located luma samples to be the motion vector for the chroma block.

3. The method of claim 2, wherein determining the motion vector for the chroma sample based on the refined motion vectors of the one or more co-located luma samples of the luma block comprises scaling the one of the refined motion vectors of the one or more co- located luma samples.

4. The method of claim 1, wherein determining the motion vector for the chroma sample based on the refined motion vectors of the one or more co-located luma samples comprises averaging at least two of the refined motion vectors of the one or more co-located luma samples to determine the motion vector for the chroma block.

5. The method of claim 1, further comprising:

performing a sample-based BDOF process on the chroma prediction block.

6. A device for decoding encoded video data, the device comprising:

a memory configured to store the encoded video data;

one or more processors implemented in circuitry and configured to:

determine an initial motion vector for a current block of the video data;

determine a luma prediction block for a luma block of the current block using the initial motion vector;

apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process, wherein to apply the one or more decoder-side motion vector refinement processes to the luma prediction block to determine the refined luma prediction block and the refined motion vectors for each luma sample of the luma block, the one or more processors are configured to:

apply a block-based bilateral matching motion vector refinement process before the BDOF process; and apply a sub-block-based bilateral matching motion vector refinement process after the block-based bilateral matching motion vector refinement process and before the BDOF process;

for a chroma sample of a chroma block, determine a motion vector for the chroma sample based on refined motion vectors of one or more co-located luma samples of the luma block;

determine a chroma prediction sample for a chroma prediction block based on the motion vector for the chroma sample;

determine a decoded version of the current block based on the refined luma prediction block and the chroma prediction block; and output a decoded picture of the video data, wherein the decoded picture comprises the decoded version of the current block.

7. The device of claim 6, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

8. The device of claim 6, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

9. The device of claim 6, wherein the current block comprises a bi-predicted block.

10. The device of claim 6, further comprising a display configured to display the decoded picture.

11. The device of claim 6, wherein the device comprises one or more of a camera, a computer, a mobile device, a broadcast receiver device, or a set-top box.

12. The device of claim 6, wherein the device comprises a wireless communication device, further comprising a receiver configured to receive the encoded video data.

13. The device of claim 12, wherein the wireless communication device comprises a telephone handset and wherein the receiver is configured to demodulate, according to a wireless communication standard, a signal comprising the encoded video data.

14. A device for encoding video data, the device comprising:

a memory configured to store the video data;

one or more processors implemented in circuitry and configured to:

determine an initial motion vector for a current block of the video data;

determine a luma prediction block for a luma block of the current block using the initial motion vector;

apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process, wherein to apply the one or more decoder-side motion vector refinement processes to the luma prediction block to determine the refined luma prediction block and the refined motion vectors for each luma sample of the luma block, the one or more processors are further configured to:

apply a block-based bilateral matching motion vector refinement process before the BODF process; and apply a sub-block-based bilateral matching motion vector refinement process after the block-based bilateral matching motion vector refinement process and before the BODF process;

for a chroma sample of a chroma block, determine a motion vector for the chroma sample based on refined motion vectors of one or more co-located luma samples;

determine a chroma prediction sample for a chroma prediction block based on the motion vector for the chroma sample;

determine a decoded version of the current block based on the refined luma prediction block and the chroma prediction block;

store a decoded picture of the video data, wherein the decoded picture comprises the decoded version of the current block; and use the decoded picture of the video data to encode a subsequent picture of video data.

15. The device of claim 14, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

16. The device of claim 14, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

17. The device of claim 14, wherein the current block comprises a bi-predicted block.

18. The device of claim 14, wherein the device comprises a wireless communication device, further comprising a transmitter configured to transmit encoded video data.

19. The device of claim 18, wherein the wireless communication device comprises a telephone handset and wherein the transmitter is configured to modulate, according to a wireless communication standard, a signal comprising the encoded video data.

20. A computer-readable storage medium storing instructions that when executed by one or more processors cause the one or more processors to:

determine an initial motion vector for a current block of video data;

determine a luma prediction block for a luma block of the current block using the initial motion vector;

apply one or more decoder-side motion vector refinement processes to the luma prediction block to determine a refined luma prediction block and refined motion vectors for each luma sample of the luma block, wherein the one or more motion vector refinement processes comprise a bi-directional optical flow (BDOF) process, wherein to apply the one or more decoder-side motion vector refinement processes to the luma prediction block to determine the refined luma prediction block and the refined motion vectors for each luma sample of the luma block, the instructions cause the one or more processors to:

apply a block-based bilateral matching motion vector refinement process before the BDOF process; and apply a sub-block-based bilateral matching motion vector refinement process after the block-based bilateral matching motion vector refinement process and before the BDOF process;

for a chroma sample of a chroma block, determine a motion vector for the chroma sample based on refined motion vectors of one or more co-located luma samples of the luma block;

determine a chroma prediction sample for a chroma prediction block based on the motion vector for the chroma sample;

determine a decoded version of the current block based on the refined luma prediction block and the chroma prediction block; and output a decoded picture of the video data, wherein the decoded picture comprises the decoded version of the current block.

21. The computer-readable storage medium of claim 20, wherein to determine the motion vector for the chroma sample based on the refined motion vectors of the one or more co-located luma samples, the one or more processors are further configured to select one of the refined motion vectors of the one or more co-located luma samples to be the motion vector for the chroma block.

22. The computer-readable storage medium of claim 20, wherein to determine the motion vector for the chroma sample based on the refined motion vectors of the one or more co-located luma samples, the one or more processors are further configured to average at least two of the refined motion vectors of the one or more co-located luma samples to determine the motion vector for the chroma block.

* * * * *